United States Patent
Nie

(10) Patent No.: US 10,827,388 B2
(45) Date of Patent: *Nov. 3, 2020

(54) AD HOC COMMUNICATION PROTOCOL METHOD AND APPARATUS

(71) Applicant: Lantiq Beteiligungs-GmbH & Co. KG, Neubiberg (DE)

(72) Inventor: Xiaoning Nie, Neubiberg (DE)

(73) Assignee: Lantiq Beteiligungs-GmbH & Co. KG, Neubiberg (DE)

( * ) Notice: Subject to any disclaimer, the term of this patent is extended or adjusted under 35 U.S.C. 154(b) by 97 days.

This patent is subject to a terminal disclaimer.

(21) Appl. No.: 15/359,804

(22) Filed: Nov. 23, 2016

(65) Prior Publication Data
US 2017/0079080 A1    Mar. 16, 2017

Related U.S. Application Data

(63) Continuation of application No. 12/277,632, filed on Nov. 25, 2008, now Pat. No. 9,544,924.

(51) Int. Cl.
*G01R 31/08* (2020.01)
*H04W 28/18* (2009.01)
(Continued)

(52) U.S. Cl.
CPC ............ *H04W 28/18* (2013.01); *H04L 69/18* (2013.01); *H04L 69/24* (2013.01); *H04W 76/10* (2018.02);
(Continued)

(58) Field of Classification Search
USPC ................................ 370/336, 235, 252, 329
See application file for complete search history.

(56) References Cited

U.S. PATENT DOCUMENTS 7,158,537 B2    1/2007   Bender et al.
7,299,038 B2    11/2007  Kennedy et al.
(Continued)

FOREIGN PATENT DOCUMENTS

WO    WO 2005/017169 A1 * 11/2005 ............. H04L 12/28

OTHER PUBLICATIONS

Notice of Allowance, dated Sep. 6, 2016, U.S. Appl. No. 12/277,632.
(Continued)

*Primary Examiner* — Phuongchau Ba Nguyen
(74) *Attorney, Agent, or Firm* — 2SPL Patent Attorneys PartG mbB

(57) ABSTRACT

According to one embodiment, a connection is established between a first communication device and a second communication device in accordance with one or more communication layers. Each communication layer is associated with a standard structure and protocol. An ad hoc communication layer structure and/or protocol are determined at the first communication device. The ad hoc communication layer structure and/or protocol are communicated to the second communication device. One or more of the standard structures and/or protocols are replaced at the first communication device with the ad hoc communication layer structure and/or protocol responsive to the second communication device acknowledging acceptance of the ad hoc communication layer structure and/or protocol.

63 Claims, 6 Drawing Sheets

(51) Int. Cl.

| | | |
|---|---|---|
| *H04L 29/06* | (2006.01) | |
| *H04W 76/10* | (2018.01) | |
| *H04W 76/12* | (2018.01) | |
| *H04W 80/00* | (2009.01) | |
| *H04W 84/18* | (2009.01) | |
| *H04W 76/20* | (2018.01) | |
| *H04W 84/12* | (2009.01) | |

(52) U.S. Cl.
CPC ............ *H04W 76/12* (2018.02); *H04W 76/20* (2018.02); *H04W 80/00* (2013.01); *H04W 84/12* (2013.01); *H04W 84/18* (2013.01)

(56) References Cited

U.S. PATENT DOCUMENTS

| | | | |
|---|---|---|---|
| 7,522,537 B2 | 4/2009 | Joshi | |
| 7,653,011 B2 | 1/2010 | Rahman et al. | |
| 7,711,670 B2 | 5/2010 | Roediger | |
| 8,488,628 B2 * | 7/2013 | Hanov | H04L 1/0007 370/331 |
| 9,544,924 B2 * | 1/2017 | Nie | H04W 76/022 |
| 2003/0133494 A1 * | 7/2003 | Bender | H04L 29/06 375/130 |
| 2004/0117497 A1 * | 6/2004 | Park | H04W 24/02 709/230 |
| 2004/0121792 A1 | 6/2004 | Allen et al. | |
| 2004/0127214 A1 | 7/2004 | Reddy et al. | |
| 2004/0202197 A1 | 10/2004 | Gao et al. | |
| 2004/0203694 A1 * | 10/2004 | Wong | H04W 88/06 455/419 |
| 2006/0002332 A1 | 1/2006 | Diaz Cervera et al. | |
| 2006/0030266 A1 * | 2/2006 | Desai | H04W 16/14 455/41.2 |
| 2006/0259627 A1 | 11/2006 | Kellerer et al. | |
| 2006/0268933 A1 | 11/2006 | Kellerer et al. | |
| 2007/0109973 A1 * | 5/2007 | Trachewsky | H04W 16/14 370/252 |
| 2007/0109992 A1 * | 5/2007 | Bennett | H04W 92/02 370/328 |
| 2007/0140191 A1 | 6/2007 | Kojima | |
| 2007/0230410 A1 | 10/2007 | Thubert et al. | |
| 2007/0233693 A1 | 10/2007 | Baxter | |
| 2007/0254596 A1 | 11/2007 | Corson et al. | |
| 2007/0281720 A1 | 12/2007 | Lee | |
| 2008/0039016 A1 | 2/2008 | Bonta et al. | |
| 2008/0279161 A1 | 11/2008 | Stirbu et al. | |
| 2009/0141653 A1 | 6/2009 | McNeill et al. | |
| 2009/0245159 A1 * | 10/2009 | Oyman | H04B 7/2606 370/315 |
| 2010/0131667 A1 | 5/2010 | Nie | |

OTHER PUBLICATIONS

Non-Final Office Action, dated Dec. 30, 2011, U.S. Appl. No. 12/277,632.
Final Office Action, dated May 10, 2012, U.S. Appl. No. 12/277,632.
Non-Final Office Action, dated Nov. 26, 2012, U.S. Appl. No. 12/277,632.
Final Office Action, dated May 28, 2013, U.S. Appl. No. 12/277,632.

* cited by examiner

AD HOC COMMUNICATION PROTOCOL METHOD AND APPARATUS

This application is a continuation of U.S. application Ser. No. 12/277,632 filed on Nov. 25, 2008, entitled "AD HOC COMMUNICATION PROTOCOL METHOD AND APPARATUS", the contents of which are incorporated by reference in their entirety.

BACKGROUND

The Open System Interconnection (OSI) reference model describes how information from a software application in one device moves through a network medium to a software application in another device. The OSI reference model is a conceptual model composed of seven layers, each specifying particular network functions. The OSI model divides the tasks involved with moving information between networked devices into seven smaller, more manageable task groups. A task or group of tasks is then assigned to each layer of the OSI model. The uppermost layer is the application layer followed by the presentation layer, session layer, transport layer, network layer, data link layer and the physical layer. Each layer is reasonably self-contained so that the tasks assigned to each layer can be implemented independently. This enables the solutions offered by one layer to be updated without adversely affecting the other layers. Standard communication models conceptually based on the OSI model include TCP/IP, SS7 (Signaling System #7), AppleTalk, SNA (Systems Network Architecture), DSL (Digital Subscriber Line). UMTS (Universal Mobile Telecommunications System), etc.

Each layer of a communication model is defined by a specific structure and corresponding protocol. The structure determines how information is arranged or organized at a particular layer, often referred to as a data unit. For example, information is organized as frames at the data link layer, packets at the network layer, segments or datagrams at the transport layer and as data at the session, presentation and application layers in the OSI model. Actual communication is made possible by using communication protocols. In the context of data communication, a protocol is a formal set of rules and conventions that governs how devices exchange information over a communication medium. A protocol implements the functions of one or more of the OSI layers.

SUMMARY

According to an embodiment, a connection is established between a first communication device and a second communication device in accordance with one or more communication layers. Each communication layer is associated with a standard structure and protocol. An ad hoc communication layer structure and/or protocol are determined at the first communication device. The ad hoc communication layer structure and/or protocol are communicated to the second communication device. One or more of the standard structures and/or protocols are replaced at the first communication device with the ad hoc communication layer structure and/or protocol responsive to the second communication device acknowledging acceptance of the ad hoc communication layer structure and/or protocol.

Those skilled in the art will recognize additional features and advantages upon reading the following detailed description, and upon viewing the accompanying drawings.

DETAILED DESCRIPTION

Figure 1:
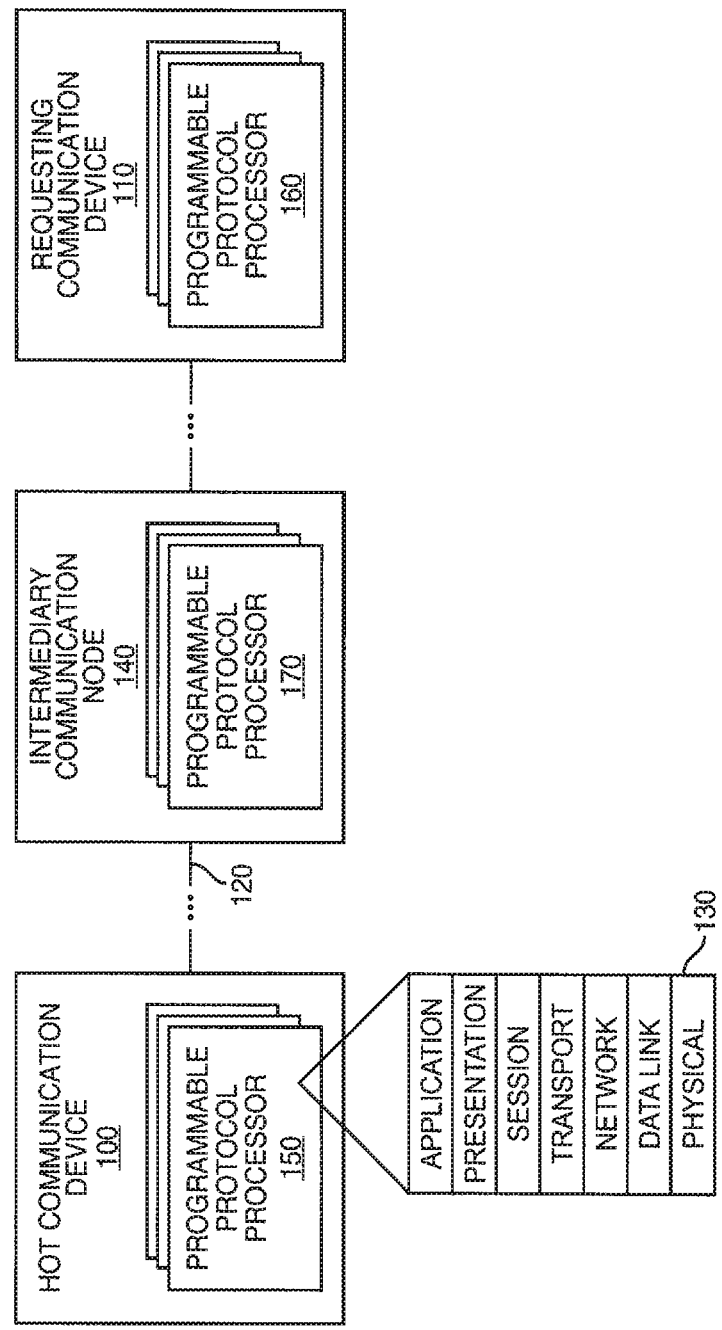
FIG. 1 illustrates an embodiment of communication devices connected over a communication network.

In the following, exemplary embodiments are described. The embodiments deal with a more flexible approach to implement data communication. In data communication, the layer structures and protocols often differ from communication standard-to-communication standard. It is hereby to be noted that in the following, "communication standards" may also be referred to shortly as "standards". For example, ATM (asynchronous transfer mode) cells use a different frame structure with different header bits than Ethernet frames. As such, Ethernet and ATM do not use the same protocol for frame processing. VDSL (very high bitrate DSL) standards use other frame structures than ADSL (Asymmetric DSL) standards, 3GPP ($3^{rd}$ generation partnership project) employs a different frame structure than WLAN (wireless local area network). Furthermore, different standards provided by different standardization organization may use different protocols or structures.

To comply with a particular communication standard such as ATM, Ethernet, WLAN, 3GPP standards such as UMTS (Universal Mobile Telecommunications System) or LIE (Long Term Evolution), etc., conventional communication devices are designed to conform (i.e., must support) the structures and protocols associated with the standard. The structure and protocol associated with each layer of the standard are standard and determined in advance. For example, PPPoE (point-to-point protocol over Ethernet) has a frame structure with predetermined fields such as source and destination address, PPPoE header, PPP ID, payload, etc. The different fields are located at particular locations within a PPPoE frame. Standardizing the structures and protocols of a communication standard ensures compatibility and interoperability across different device platforms.

However, using standard structures and protocols to implement a communication model greatly limits the ability of communication devices to adapt their performance to changing operating conditions in the field. For example, particular channel conditions may warrant a more optimal data link layer frame structure and/or protocol than provided by the standard data link layer frame structure and/or protocol, Higher layers of the communication standard may also benefit from more optimal structures and protocols in view of other operating conditions. However, the performance benefits associated with more optimal layer structures and protocols are not obtainable by conventional communication devices because the devices have little or no flexibility in the way layer structures and protocols are implemented to support a particular communication standard. Using relatively rigid structures and protocols to implement a communication standard prevents devices from implementing more efficient structures and protocols when operating conditions warrant such changes. Realizing the above described problems, in the following embodiments will be described a new and flexible ad hoc approach to data communication protocol handling.

FIG. 1 illustrates an embodiment of a host communication device 100 communicatively coupled to a requesting communication device 110 over a communication network 120. The communication network 120 can be wired, wireless or a combination of both. The requesting device 110 sends requests to the host device 100 for processing and can comprise any type of wired or wireless device capable of communicating with the host device 100. For example, the requesting device 110 can be a telecommunication modem or a telecommunication management unit in connection with a telecommunication modem, a desktop or portable computer, server, router, network-capable portable electronic device such as a mobile phone, smartphone, portable media player. PDA, etc. or any other type of electronic device capable of network communication. The host device 100 can be any type of wired or wireless device that responds to requests received from the requesting device 110 and can also be a desktop or portable computer, server, network-capable portable electronic device such as a mobile phone, smartphone, portable media player, PDA, etc. or any other type of electronic device capable of network communication.

The devices 100/110 communicate over the network 120 by establishing a connection with each other in accordance with a wired or wireless communication standard such as xDSL (where x stands for any type of DSL), ATM, Ethernet, WLAN, 3GPP, etc. Each communication device 100/110 supports the particular communication standard by implementing one or more communication layers 130 mandated by the standard. For example, the devices 100/110 may implement the seven layers of the OSI model or any other model associated with the communication standard. Each layer has a well-defined, standardized structure and protocol that together control how information is organized and processed across the entire communication stack 130. The standard layer structures and protocols enable the devices 100/110 to establish a communication connection between each other in a repeatable and well-controlled manner. However, the standard layer structures and protocols offer little or no flexibility in the way layer functions are defined because the structures and protocols are standardized.

After the communication connection is established between the devices 100/110, the host device 100 can determine whether a more optimal structure and/or protocol can be implemented at any of the communication layers 130 based on actual operating conditions observed by the host or requesting devices 100/110 or based on other conditions or parameters as will be described in more detail later. As such, the devices 100/110 do not always adhere to the same standard layer structures and protocols the entire time the connection is active. Instead, the host device 100 can flexibly modify or even replace some or all layer processing functions performed in support of the communication connection as operating conditions warrant. In some embodiments, the new or modified layer structure and protocol may not be in compliance with a communication standard any more, i.e. it may be a proprietary structure or protocol. For example, it could be determined that a configuration of a protocol may be more appropriate which is not in compliance with the communication standard for example by providing a data link layer which is not in compliance with data communication standards. For example, the modified layer structure or protocol could use all the functions specified in a communication standards but replace the error correction scheme by another type or another configuration of an error correction scheme when it is determined that the modified error correction scheme provides better transmission performance.

In one embodiment, the host device 100 determines an ad hoc communication layer structure and/or protocol for one or more communication layers 130 based on actual operating conditions. Each new layer processing function is ad hoc in that the function is not a standard function, but instead is tailored to the particular communication environment in which the host and requesting devices 100/110 are operating. For example, an ad hoc data link layer function enables data to be transferred between the host and requesting devices 100, 100 and may also enable the detection and possibly correction of errors that may occur in the physical layer. The host device 100, requesting device 110 or other devices can measure the data rate, channel quality, BER (bit error rate) and/or other variables associated with the communication connection. This information car be used to determine whether a more optimal data link layer frame structure and/or protocol can be implemented instead of the standard data link layer structure and/or protocol used to initially establish the communication connection. According to one embodiment, a shorter frame size may be advantageous when BER is high or channel quality is poor. Alternatively or in addition, a more robust CRC (cyclic redundancy check) protocol or different type of error checking protocol may be preferred over the standard error checking protocol employed at the data link layer.

Other layers 130 of the communication standard can be analyzed for improvement based on operating conditions such as the type, quality and/or reliability of the application being executed by the devices. For example VoIP (Voice over IP) applications have a low delay tolerance and banking applications have high security requirements. These types of operating conditions as well as others can be considered when determining whether to modify or replace one or more of the standard layer structures and/or protocols implemented by the devices 100/110. Replacing standard layer functions with more optimal layer functions can increase device performance, improve device reliability, reduce power consumption, etc. The decision to replace standard layer functions can also be based on the capabilities of the requesting device 110, e.g., the bandwidth, memory size, processor speed and/or architecture, etc, of the requesting device 110.

The host communication device 100 communicates the new layer information to the requesting device 110 for implementation. The requesting device 110 determines whether it can support the new layer structure and/or protocol and indicates this to the host device 100. In response, the host device 100 replaces at least some of the standard layer processing functions implemented at the host device 100 with the new layer processing functions responsive to the requesting device 110 acknowledging acceptance of the new layer information. The devices 100/110 continue communication using the new layer structure(s) and/or protocol(s), optimizing device performance in view of actual operating conditions. The decision to replace or modify one or more layers 130 of a communication standard can be made during a setup or initialization period while the communication connection is being established or shortly thereafter. The decision to modify or replace one or more layer functions can be occasionally revisited while the connection remains active to account for changing operating conditions, e.g., changing BER, data rate, channel quality, etc. The operating conditions measured to make layer processing decisions can be associated with any layer of the communication standard, e.g., ranging from the physical layer to the application layer for the OSI model.

Certain communication standards such as DSL permit relatively direct device communication in a secure network environment. Other communication standards such as Ethernet, WLAN, etc. use intermediary network nodes 140 to facilitate a connection between the host communication and requesting devices 100/110. These intermediary nodes 140 implement standard layer processing functions to initially establish the connection. As such, the host device 100 also communicates any new layer information to the intermediary nodes 140 that support the connection. According to one embodiment, one or more standard layer processing functions are replaced at the host device 100 responsive to the requesting device 110 and each intermediary node 140 acknowledging acceptance of new layer processing information. This ensures a reliable communication path is maintained over the entire physical connection, including at the intermediary nodes 140.

In some embodiments, the intermediary nodes 140 do not implement the entire layer stack implemented by the host and requesting devices 100/110. The intermediary nodes 140 do not always have to process data at the upper layers of the communication standard. In one embodiment, one or more of the intermediary nodes 140 are LAN (local area network) devices that operate at the physical and data link layers of the communication model and define communication over the various LAN media. In another embodiment, one or more of the intermediary nodes 140 are WAN (wide area network) devices that operate at the lowest three layers of the communication model and define communication over various wide-area media. In yet another embodiment, one or more of the intermediary nodes 140 are a routing device responsible for exchanging information between routers so that the routers can select the proper path for network traffic.

In more detail, each communication device 100/110 and intermediary node 140 (if present) has one or more programmable protocol processors 150/160/170 for implementing the different layers 130 of a communication standard. The protocol processors 150/160/170 are programmable so that the devices 100/110 and intermediary nodes 140 can implement layer processing functions in a soft, flexible manner based on actual operating conditions while maintaining reliable communication. This way, inflexible and rigid standard layer processing functions can be readily modified or replaced altogether with more optimal functions when operating conditions warrant. The programmable protocol processors 150/160/170 can be any type of logic device capable of executing code designed to implement layer processing functions. The programmable processors 150/160/170 may comprise a microprocessor, digital signal processor, programmable logic or any other type of programmable device. The programmable protocol processors 150/160/170 can be implemented in hardware, software, firmware or any combination thereof.

In one embodiment, each communication device 100/110 and intermediary node 140 (if present) has at least one programmable protocol processor 150/160/170 for implementing the functions associated h the physical and data link layers of a communication standard. Another protocol processor can be provided to implement the functions associated with the network layer of the communication standard. Other protocol processor configurations are possible depending on the application(s) under consideration and the communication standard(s) supported. The protocol processors 150/160/170 can also support multiple communication standards if desired, e.g., WiFi and WLAN, WLAN and 3GPP, etc. thereby enabling both wired and wireless communication at the devices 100/110. In each case, the programmable protocol processors 150/160/170 implement standard layer structures and protocols to establish an initial connection between the host and requesting communication devices 100/110. One or more of the standard layer structures and/or protocols can be modified or replaced by one or more ad hoc layer structures and/or protocols after the connection is established based on operating conditions. The standard layer structures and/or protocols can also be modified or replaced by newer standardized layer structures and/or protocols unavailable when the devices 100/110 were designed and manufactured such as successors of certain protocols. Accordingly, newer standardized communication protocol layers can be implemented as standards evolve without redesigning the devices 100/110.

Figure 2:
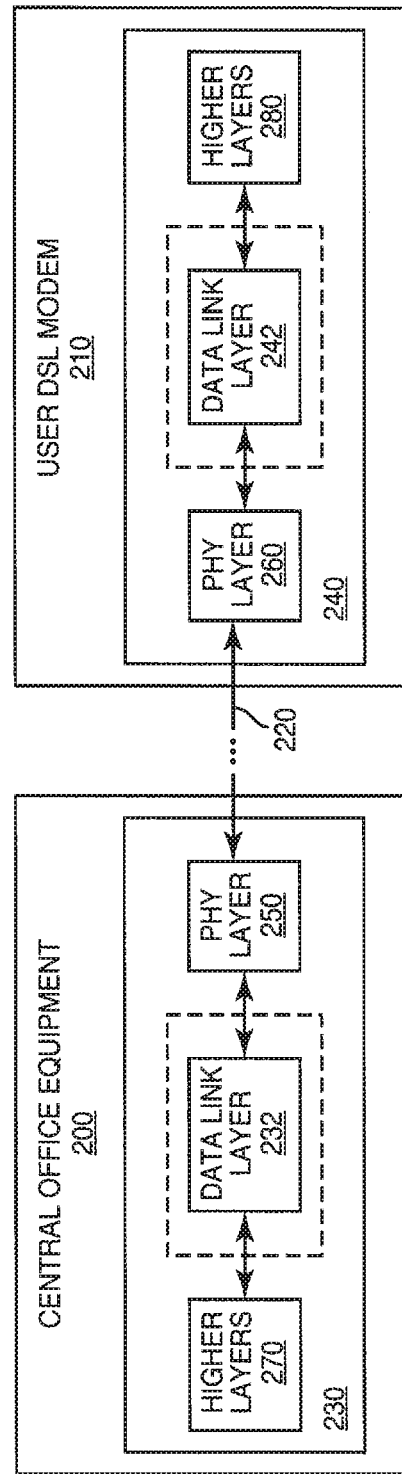
FIG. 2 illustrates an embodiment of communication devices connected over a DSL communication network.

FIG. 2 illustrates an embodiment of central office (CO) equipment 200 communicatively coupled to a modem 210 over a DSL (digital subscriber line) communication network 220. DSL is a family of technologies that provides digital data transmission over the wires of a local telephone network. DSL standards determine how information moves from a software application in the DSL modem 210 through the network medium to a software application in the CO equipment 200. The CO equipment 200 and DSL modem 210 both have at least one programmable protocol processor 230/240 for implementing standard DSL layer processing so that a connection can be established between the devices 200/210. According to one embodiment, the programmable protocol processors 230/240 have the added flexibility to modify or replace at least some of the standard DSL data link layer 232/242 functions implemented at the devices 200/210 with new ad hoc data link structure(s) and/or protocol(s) based on actual operating conditions. The new ad hoc data link layer functions enable data to be transferred between devices 200/210 and may also enable the detection and possibly correction of errors that may occur in the physical layer. In other embodiments, the programmable protocol processors 230/240 also have the added flexibility to modify or replace standard DSL layer functions implemented above and/or below the data link layer 232/242, e.g., at the physical layer 250/260 or at layers 270/280 above the data link layer.

In one embodiment, some or all of the data link functionality of the standard DSL data link layer 232/242 can be modified or replaced by the programmable processors 230/240 as indicated by the dashed lines. Data link performance is affected by channel conditions and data loss. Accordingly, different standard CRC schemes are typically provided to address a range of conditions. Also, different standard frame sizes are also typically available to address a range of channel conditions and data loss scenarios. For example, longer frame sizes are permitted when channel conditions are good and BER is low. Conversely, shorter frame sizes are used when channel conditions are bad and BER is high. The programmable protocol processors 230/240 can modify the frame size (structure) and/or CRC algorithm (protocol) beyond the standardized boundaries, providing additional flexibility to the devices 200/210 to further improve performance based on channel conditions and/or BER. The programmable protocol processors 230/240 may even implement a different error detection algorithm other than CRC. Also, error checking and other protocols tend to be typically implemented at multiple layers of a communication standard. Too much redundancy of this kind can degrade performance. The programmable protocol processors 230/240 can reduce unnecessary redundancy by lowering the amount of error detection and/or other functions performed at different layers so that these functions are performed only at a few layers or a single layer depending on operating conditions and device requirements. This added flexibility permits the devices 200/210 to implement ad hoc layer processing functions tailored to the communication environment in which the devices 200/210 operate or newer standardized functions previously unavailable to the devices 200/210. While the above is directed to the data link level, it is to be noted that other embodiments may provide the same described operations and flexibility for other layers for example PHY layer or specific sublayers, for example higher sublayers of the PHY layer, etc.

Figure 3:
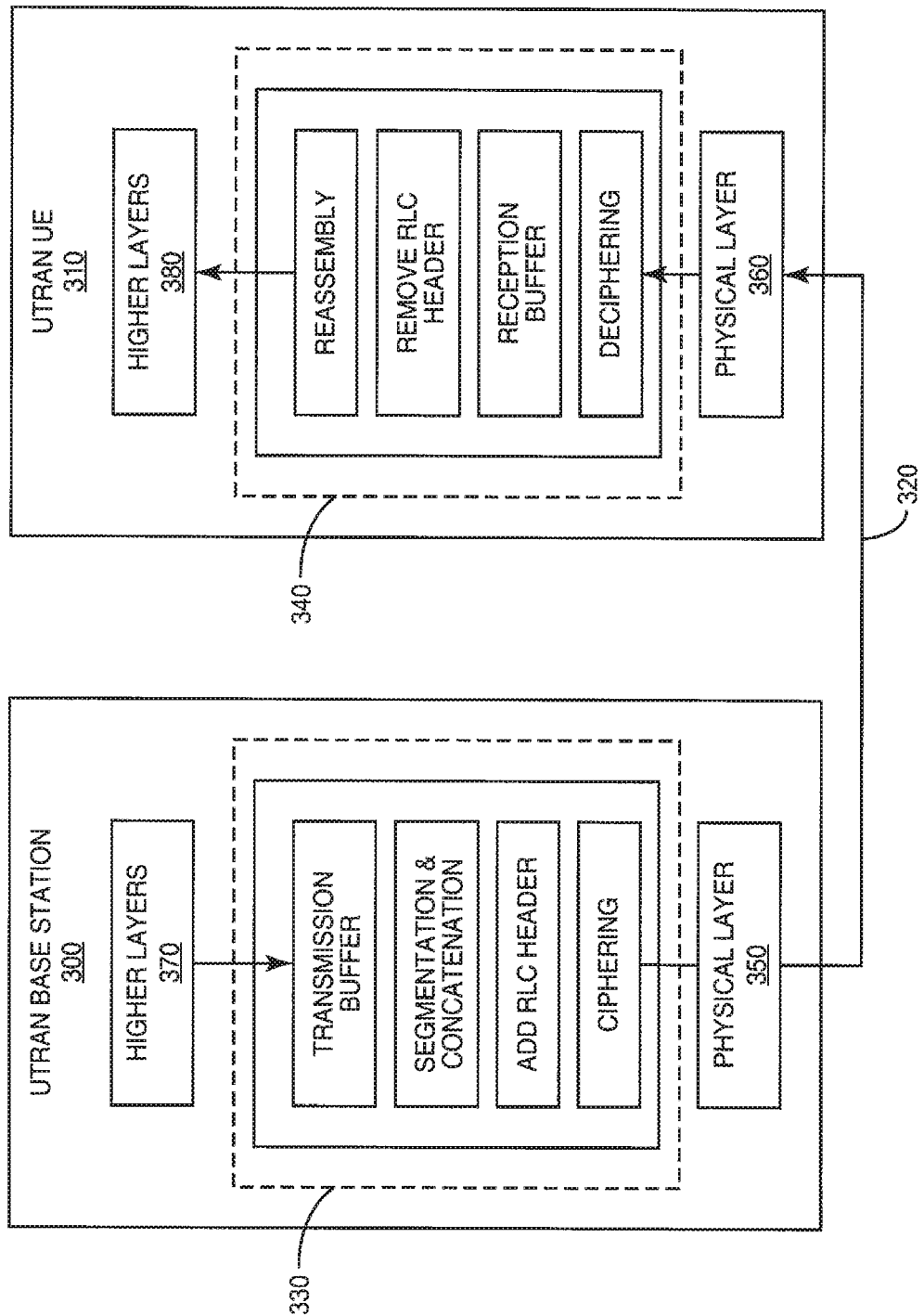
FIG. 3 illustrates an embodiment of communication devices connected over a UTRAN communication network.

FIG. 3 illustrates an embodiment of a radio base station 300 communicatively coupled to user equipment 310 such as a mobile handset over a wireless UMTS Terrestrial Radio Access Network (UTRAN) 320. UTRAN is part of the 3GPP family of wireless communication standards and can carry many traffic types from real-time circuit-switched data to IP-based packet-switched data. The base station 300 and user equipment 310 each implement various radio protocols such as MAC (media access control), radio link control (RLC), packet data convergence (PDC), broadcast/multicast control (BMC) and radio resource control (RRC) so that the devices 300/310 can communicate over the UTRAN wireless network 320. The programmable processor 330 included in the base station 300 implements standard radio functions such as buffering, segmentation and concatenation, RLC header processing and ciphering. The programmable processor 340 included in the user equipment 310 implements corresponding standard radio functions such as de-ciphering, buffering, RLC header processing and reassembly. Standard radio functions such as these and others enable the devices 300/310 to establish an initial communication connection over the UTRAN wireless network.

The programmable protocol processors 330/340 have the added flexibility to modify or replace at least some of the standard radio layer functions with one or more ad hoc or newer standardized radio structures and/or protocols. The programmable protocol processors 330/340 may also have the added flexibility to modify or replace at least some of the standard layer functions implemented above and/or below the radio layer, e.g., at the physical layer 350/360 or at layers 370/380 above the radio layer. According to one embodiment, operating conditions such as channel conditions, BER and/or data rate determine whether any of the standard radio functions are replaced or modified with ad hoc structures and/or protocols. For example, an ad hoc packet compression algorithm may be implemented. Ad hoc retransmission and/or an ad hoc reordering algorithm can also be implemented, e.g., based on the availability of base station resources and/or transmission link quality. Redundancy can be eliminated from the different radio functions when conditions permit, e.g., by implementing ciphering at the MAC or RLC sub-layer, but not both as is standard practice. In addition, preexisting standard layer functions can be replaced with newer standardized functions as communication standards evolve. In each of these layer modification/replacement embodiments, the programmable protocol processors 330/340 implement the new layer functions to ensure reliable and stable communication.

Figure 4:
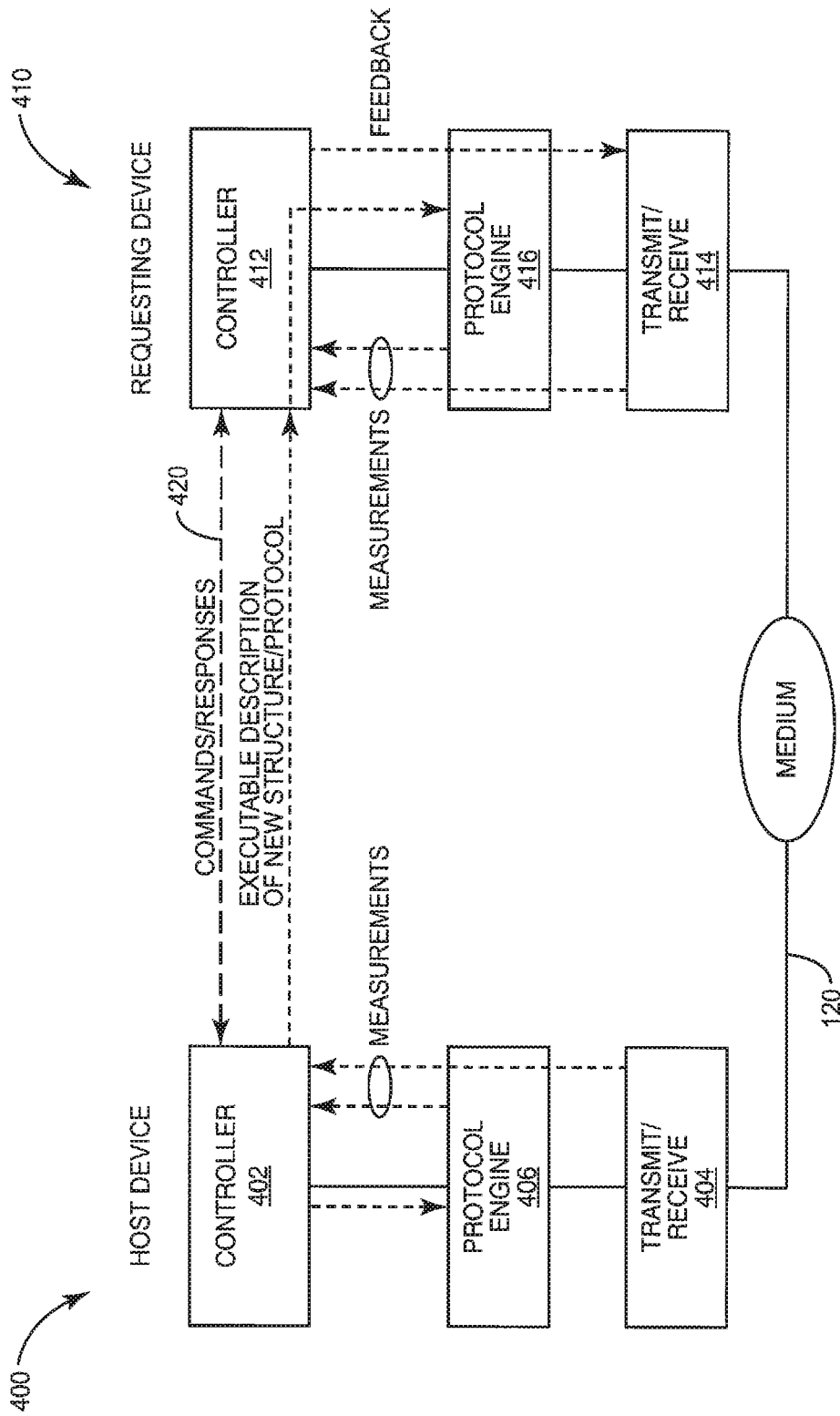
FIG. 4 illustrates an embodiment of programmable protocol processors included in communication devices.

FIG. 4 illustrates an embodiment of programmable processors included in the host and requesting devices 100/110. Each programmable processor 400/410 includes a controller 402/412 for managing overall operation and transmit/receive circuitry 404/414 for implementing physical signaling. Each programmable processor 400/410 also includes a protocol engine 406/416 implemented in hardware, software, firmware or some combination thereof. The protocol engines 406/416, e.g., a java engine or the like implement standard communication layer functions to establish an initial communication connection between the devices 100/110. The protocol engines 406/416 also modify or replace some or all of the standard layer functions with new functions based on operating conditions as explained above. The process to determine whether to modify or replace a layer function can rest with the host protocol engine 406, host controller 402 or other logic included in or associated with the host device 100 or can be made externally to the host device 100, e.g., by a remote software program. In each case, the host protocol engine 406 has enough flexibility to implement new layer functions.

In one embodiment, new layer functions are described using an executable description of the new functions. As used herein, the term 'executable description' can be code ready for execution (e.g., executable code), code that requires a final compilation or interpretation step before execution (e.g., bytecode), markup language code such as HTML, XML, etc. or any other representation that can be processed to implement one or more new communication layer functions by the programmable processors 400/410. In one embodiment, the protocol engines 406/416 execute the executable description to implement new layer functions. The code can be used natively on the devices 100/110 or interpreted without modification. Alternatively, the code is taken as a specification which is transformed (i.e., translated) to an equivalent code executable on each computing platform.

In one embodiment, the executable code is independent of the platform or operating system used by the devices 100/110. In one embodiment, the code is a program running on each of a plurality of supported hardware/operating system platforms. In other words, according to embodiments, the program once written, is allowed to run everywhere either by compiling the written code before or by directly executing the written program. Thus, the program may be executed on every device 100/110 independent of the hardware and operating system used by the device 100/110. In one embodiment, the executable code may run on a virtual machine such as a virtual Java machine. Thus, according to this embodiment, a virtual machine program such as a Java virtual machine program runs on the processor of devices 100/110 to make the device independent on the specific operating system and hardware. The virtual machine program running on the processor is capable to interpret the executable code. Thus, the executable code in this embodiment is not a machine code but is a virtual machine code such as a Java byte code similar to machine code, but intended to be interpreted by the virtual machine. The virtual machine may use standardized libraries. In one embodiment, the machine code generated by the virtual machine based on the virtual machine code or machine codes of frequently used parts of the program may be cached or stored and may be used in further sessions to run the program or parts of the program without the additional overhead of a virtual machine directly as native executables.

Furthermore, while the whole data processing of at least the data link layer based on the executable code may be performed in embodiments in software, other embodiments may have a combination of hardware and software. Thus, in these embodiments, hardware components which are beyond the hardware for a general purpose processor or a dedicated processor (such as a digital signal processor) may be provided in addition to the processor to perform processing which is basic to data communication protocol in hardware. Such processing may include fundamental parsing functions or parts thereof, fundamental security functions or parts thereof, fundamental error protection functions or parts thereof. Since only basic processing of the protocol is realized in hardware, the data processing based on the executable description is still flexible and changeable.

Figure 5:
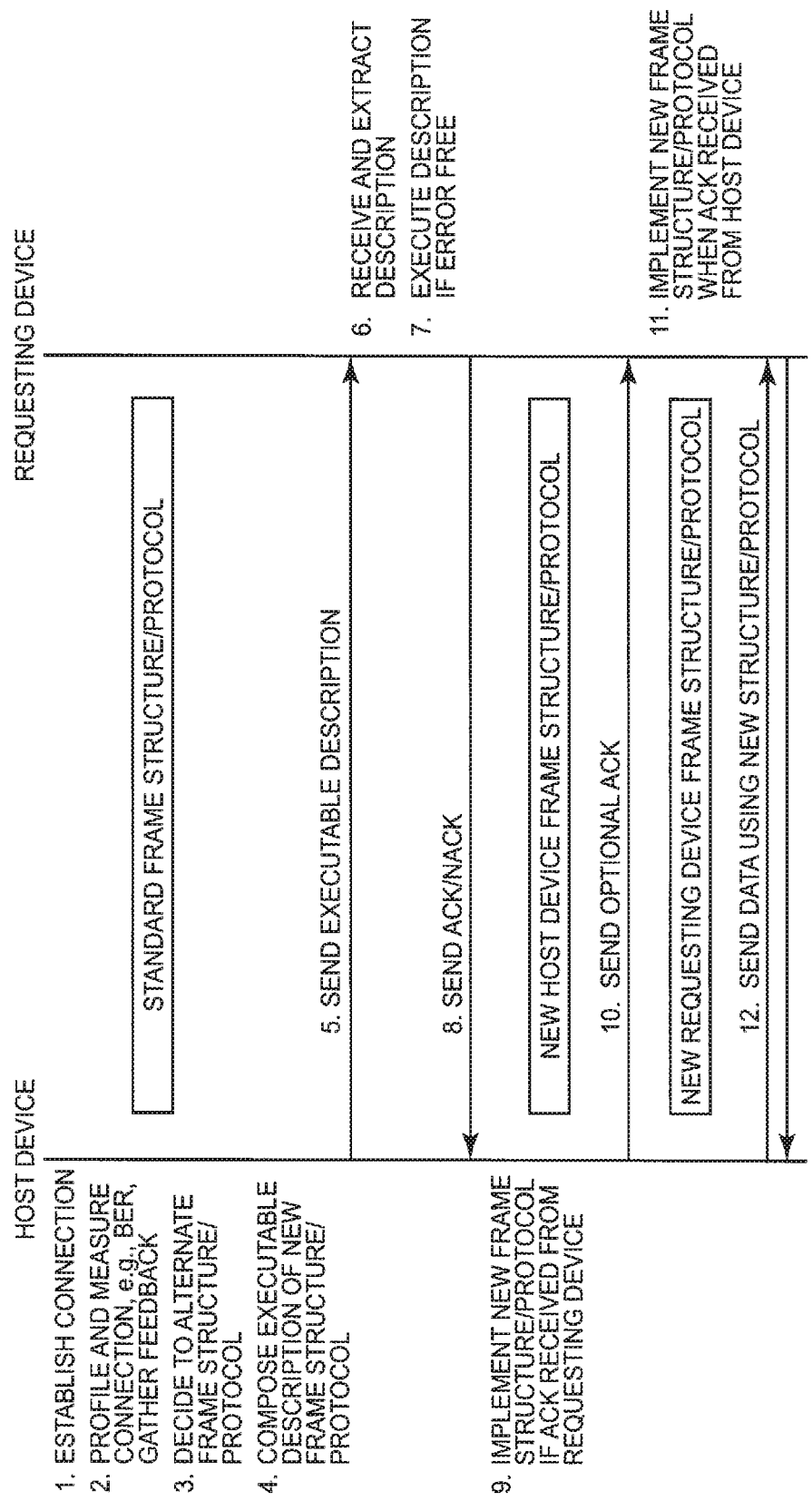
FIG. 5 illustrates an embodiment of a method for establishing and maintaining a connection between communication devices.

FIG. 5 illustrates an embodiment of a method for generating an executable description of a communication layer function, communicating the executable description to the requesting device 110 and executing the description at the host and requesting devices 100/110 to implement the new layer functions. For illustrative purposes only. FIG. 5 shows how an executable description of a new data link structure and/or protocol is generated, communicated and executed. However, the executable description can be for any layer of a communication standard.

After an initial connection is established between the communication devices 100/110 (Step 1), the quality of the connection is assessed (Step 2), e.g., by gathering BER, channel quality, data rate and/or other information relating to the connection. As shown in FIG. 4, the information can be gathered by the host device 100 or by the requesting device 110 and fed back to the host device 100 over the connection. The host controller 402 and/or protocol engine 406 analyzes the connection information to determine whether any data link layer functions can be modified or replaced with more optimal functions (Step 3). If so, the host controller 402 and/or protocol engine 406 composes an executable description of a new data link layer frame structure and/or protocol as previously described herein (Step 4). Alternatively, the executable description can be composed external to the host device 100 and downloaded to the host 100 for execution (Step 4). In either case, the host device 100 communicates the executable description to the requesting device 110 using the standard data link layer structure and protocol (Step 5). In one embodiment, the executable description is communicated to the requesting device over a data channel of the communication connection. In another embodiment, a control signaling channel 420 of the connection is used to transmit the executable description to the requesting device 110 in accordance with the standard data link structures and protocols.

In either case, the requesting device 110 receives and extracts the executable description (Step 6). The requesting device controller 412 and/or protocol engine 416 determines whether the executable description is error-free and whether the protocol engine can implement the new data link layer frame structure and/or protocol represented by the executable description. In one embodiment, the requesting device controller 412 and/or protocol engine 416 compiles, interprets and/or executes the executable description to make this determination, depending on the type of executable description (e.g., executable code is executed, bytecode is compiled and/or interpreted during or before execution, etc.). The new data link layer frame structure and/or protocol is implemented at the requesting device if supported and error-free (Step 7). The requesting device 110 sends a message to the host device 100 indicating whether the new data link layer frame structure and/or protocol has been successfully implemented at the requesting device 110 (Step 8). If not acknowledged (NACK) by the requesting device 110, the devices 100/110 continue communicating using the standard layer functions. If acknowledged (ACK) by the requesting device 110, the host device 100 implements the new data link layer frame structure and/or protocol by compiling, interpreting and/or executing the executable description (Step 9). The host device 100 may send an optional acknowledgement message (ACK) to the requesting device 110 indicating the new data link layer function(s) have been implemented at the host device 100 (Step 10). Alternatively, no acknowledgement message (ACK) is sent to the requesting device 110. In either embodiment, the requesting device 110 also implements the new data link layer frame structure and/or protocol by executing the executable description (Step 11). Accordingly, both devices 100/110 implement the new layer function(s) and begin communicating in accordance with these function(s) over the preexisting connection (Step 12). Otherwise, the devices 100/110 continue communicating using the standard functions.

Figure 6:
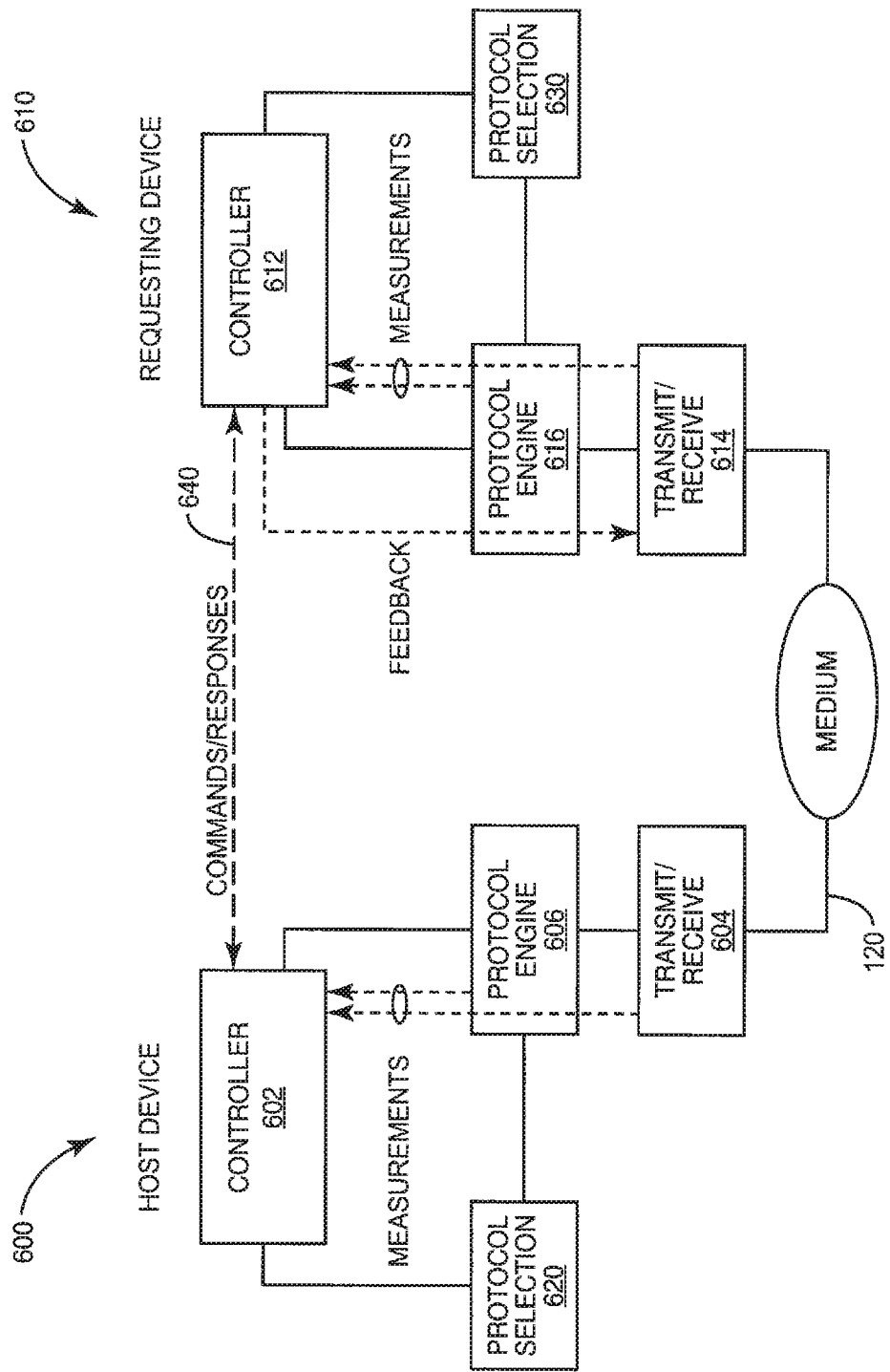
FIG. 6 illustrates another embodiment of programmable protocol processors included in communication devices.

FIG. 6 illustrates another embodiment of programmable processors 600/610 included in the host and requesting devices 100/110. Each programmable processor 600/610 has a controller 602/612, transmit/receive circuitry 604/614 and protocol engine 606/616 as described above. According to this embodiment, the protocol engines 606/616 access respective protocol selection logic 620/630 such as a lookup table to identify which of one or more predetermined ad hoc layer structures and/or protocols should be implemented by the communication devices 100/110. The protocol selection logic 620/630 stores or has access to a plurality of predetermined ad hoc layer structures and/or protocols. If one or more of the predetermined structures and/or protocols is determined to be more optimal than a standard structure and/or protocol, the standard structure and/or protocol is replaced by the more optimal solution. The requesting device 110 can be notified of which predetermined ad hoc layer structure(s) and/or protocol(s) to implement by sending an index or other type of identifier to the requesting device 110. In one embodiment, the index/identifier is communicated to the requesting device 110 over a data path of the communication connection. In another embodiment, the index/identifier is communicated to the requesting device 110 over a control signaling channel 640 of the communication connection. In either case, the index/identifier determines which ad hoc layer structure(s) and/or protocol(s) should be chosen by the requesting device selection logic 630 and implemented by the requesting device protocol engine 616.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A mobile phone comprising:
a processor configured to process communication signals according to a mobile phone standard to communicate in a communication connection with another communication device;
a memory coupled to the processor, wherein the memory stores configuration settings for the processor to process the communication signals;
wherein the memory stores configuration settings for the processor to replace at least one function of the mobile phone standard with at least one function of a Wireless Lan (WLAN) protocol based on one or more actual operating conditions associated with the communication connection; and
wherein the memory stores configuration settings for the processor to communicate use of the WLAN protocol to the another communication device.

2. The mobile phone of claim 1, wherein the processor replaces the at least one function of the mobile phone standard with the at least one function of the WLAN protocol at a communication layer.

3. The mobile phone of claim 2, further comprising a data link layer that processes communication signals according to a mobile phone standard to communicate with the another communication device.

4. The mobile phone of claim 3, wherein the at least one function of the WLAN protocol includes an ad hoc cyclic redundancy check algorithm for the data link layer.

5. The mobile phone of claim 4, wherein an ad hoc protocol implements different radio functions at a media access control (MAC) or radio link control (RLC) sub-layer, but not both.

6. The mobile phone of claim 2, wherein the processor replaces the at least one function of the mobile phone standard with the at least one function of the WLAN protocol at the communication layer which is above a radio layer.

7. The mobile phone of claim 2, wherein the at least one function of the WLAN protocol is selected from a group consisting of error correction, radio functions, deciphering, buffering, RLC, header processing, reassembly, packet compression, transmission/retransmission, and reordering.

8. The mobile phone of claim 1, wherein the processor replaces the at least one function of the mobile phone standard with the at least one function of the WLAN protocol by modifying the at least one function of the mobile phone standard.

9. The mobile phone of claim 1, wherein the processor replaces the at least one function of the mobile phone standard with the at least one function of the WLAN protocol based on operating conditions, wherein the operating conditions are selected from a group consisting of channel conditions, BER (bit error rate), data rate determine, on availability of base station resources, transmission link quality, memory size, processor speed, processor architecture, VoIP (voice over IP) applications, and high security applications.

10. The mobile phone of claim 1, wherein the processor replaces the at least one function of the mobile phone standard with the at least one function of the WLAN protocol after initialization.

11. The mobile phone of claim 1, wherein the processor replaces the at least one function of the mobile phone standard with the at least one function of the WLAN protocol in response to a determination made remotely by a base station.

12. The mobile phone of claim 11, wherein the determination made remotely by the base station sends operating conditions to the mobile phone.

13. The mobile phone of claim 11, wherein the at least one function of the mobile phone standard is a subset of all functions in the mobile phone standard.

14. The mobile phone of claim 1, wherein the another communication device is a mobile phone.

15. The mobile phone of claim 1, wherein the mobile phone includes transmit and receive circuitry.

16. The mobile phone of claim 1, wherein the mobile phone standard is selected from a group consisting of asynchronous transfer mode (ATM), Ethernet, WLAN, 3GPP standards such as Universal Mobile Telecommunications System (UMTS) and Long Term Evolution (LTE).

17. The mobile phone of claim 16, wherein the WLAN protocol is selected from a group consisting of radio link control (RLC), packet data convergence (PDC), broadcast/multicast control (BMC) and radio resource control (RRC).

18. The mobile phone of claim 1, wherein the another communication device is selected from a group consisting of a desktop computer, portable computer, server, network-capable portable electronic device, a mobile phone, smartphone, portable media player, and a personal digital assistant (PDA).

19. The mobile phone of claim 1, further comprising processors capable of accepting different mobile phone standards and wherein at least one of the processors comprises memory storing configuration settings for the processor to replace the at least one function of the mobile phone standard with the at least one function of the WLAN protocol.

20. The mobile phone of claim 1, wherein the memory stores configuration settings for the processor to communicate in the WLAN protocol to one or more intermediary communication nodes.

21. The mobile phone of claim 1, wherein the WLAN protocol is used by the mobile phone to communicate to the another communication device.

22. The mobile phone of claim 1, wherein the memory stores configuration settings for the processor to the at least one function of the mobile phone standard with the at least one function of the WLAN protocol responsive to the another communication device acknowledging acceptance of the WLAN protocol.

23. A method for operating a mobile phone having a processor to communicate signals, comprising the steps of:
    processing, via the processor, communication signals in a communication connection according to a mobile phone standard to communicate with another communication device;
    replacing, via the processor, at least one function of the mobile phone standard with at least one function of a Wireless Lan (WLAN) protocol based on one or more actual operating conditions associated with the communication connection; and
    communicating, via the processor, use of the WLAN protocol to the another communication device.

24. The method of claim 23, further comprising the step of replacing the at least one function of the mobile phone standard with the at least one function of the WLAN protocol at a communication layer.

25. The method of claim 24, further comprising a data link layer that processes communication signals according to a mobile phone standard to communicate with another communication device wherein the communication layer is the data link layer.

26. The method of claim 25, further comprising the step of replacing the at least one function of the mobile phone standard with an ad hoc cyclic redundancy check algorithm for the data link layer.

27. The method of claim 24, wherein the step of replacing replaces the at least one function of the mobile phone standard with the at least one function of the WLAN protocol at the communication layer which is above a radio layer.

28. The method of claim 24, wherein the step of replacing replaces the at least one function of the mobile phone standard with at least one different radio function at a media access control (MAC) or radio link control (RLC) sub-layer, but not both.

29. The method of claim 24, wherein the at least one function of the WLAN protocol is selected from a group consisting of error correction, radio functions, deciphering, buffering, RLC, header processing, reassembly, packet compression, transmission/retransmission, and reordering.

30. The method of claim 23, wherein the step of replacing replaces the at least one function of the mobile phone standard with the at least one function of the WLAN protocol by modifying the at least one function of the mobile phone standard.

31. The method of claim 23, wherein the step of replacing replaces the at least one function of the mobile phone standard with the at least one function of the WLAN protocol based on operating conditions, wherein the operating conditions are selected from a group consisting of channel conditions, BER (bit error rate), data rate determine, on availability of method resources, transmission link quality, memory size, processor speed, processor architecture, VoIP (voice over IP) applications, and high security applications.

32. The method of claim 23, wherein the step of replacing replaces the at least one function of the mobile phone standard with the at least one function of the WLAN protocol after initialization.

33. The method of claim 23, wherein the step of replacing replaces the at least one function of the mobile phone standard with the at least one function of the WLAN protocol in response to a determination made remotely.

34. The method of claim 33, further comprising a step of sending operating conditions to the mobile phone.

35. The method of claim 23, wherein the WLAN protocol is a proprietary protocol.

36. The method of claim 23, wherein the another communication device is a mobile phone.

37. The method of claim 23, further comprising steps of transmitting and receiving the communication signals.

38. The method of claim 23, further comprising a step of selecting the mobile phone standard from a group consisting of asynchronous transfer mode (ATM), Ethernet, WLAN, or 3GPP standards comprising Universal Mobile Telecommunications System (UMTS) and Long Term Evolution (LTE).

39. The method of claim 38, further comprising a step of selecting the WLAN protocol from a group consisting of radio link control (RLC), packet data convergence (PDC), broadcast/multicast control (BMC) and radio resource control (RRC).

40. The method of claim 38, further comprising a step of selecting the another communication device from a group consisting of a desktop computer, a portable computer, server, a network-capable portable electronic device, a mobile phone, smartphone, portable media player, and a personal digital assistant (PDA).

41. The method of claim 23, further comprising the step of processing the communication signals using multiple processors according to different mobile phone standards wherein at least one of the processors comprise memory that stores configuration settings for the processor to replace the at least one function of the mobile phone standard with the at least one function of the WLAN protocol.

42. The method of claim 23, further comprising the step of communicating in the WLAN protocol to one or more intermediary communication nodes.

43. The method of claim 23, further comprising the step of communicating in the WLAN protocol to the another communication device.

44. The method of claim 23, wherein the step of replacing the at least one function of the mobile phone standard with the at least one function of the WLAN protocol responsive to the another communication device acknowledging acceptance of the WLAN protocol.

45. A base station comprising:
a processor configured to process communication signals according to a mobile phone standard to communicate in a communication connection with a mobile phone; and
wherein the processor is configured to provide an identifier signal identifying functions of a Wireless Lan (WLAN) protocol that the mobile phone is enabled to implement in replacement of at least one function of the mobile phone standard based on one or more actual operating conditions associated with the communication connection.

46. The base station of claim 45, wherein the identifier signal identifying the at least one function of the mobile phone standard with the at least one function of the WLAN protocol is at a communication layer of the mobile phone.

47. The base station of claim 46, wherein the communication layer of the mobile phone is a data link layer.

48. The base station of claim 47, wherein the at least one function of the WLAN protocol include an ad hoc cyclic redundancy check algorithm for the data link layer.

49. The base station of claim 46, wherein the communication layer of the mobile phone is above a radio layer.

50. The base station of claim 46, wherein the WLAN protocol implements different radio functions at a media access control (MAC) or radio link control (RLC) sub-layer, but not both.

51. The base station of claim 46, wherein the at least one function of the WLAN protocol is selected from a group consisting of error correction, radio functions, deciphering, buffering, RLC, header processing, reassembly, packet compression, transmission/retransmission, and reordering.

52. The base station of claim 45, wherein the identifier signal identifying the at least one function of the mobile phone standard with the at least one function of the WLAN protocol is provided by modifying the at least one function of the mobile phone standard.

53. The base station of claim 45, wherein the processor is configured to provide an identifier signal identifying the at least one function of the mobile phone standard with the at least one function of the WLAN protocol based on operating conditions, wherein the operating conditions are selected from a group consisting of channel conditions, BER (bit error rate), data rate determine, on availability of base station resources, transmission link quality, memory size, processor speed, processor architecture, VoIP (voice over IP) applications, and high security applications.

54. The base station of claim 45, wherein the processor is configured to provide an identifier signal identifying the at least one function of the mobile phone standard with the at least one function of the WLAN protocol after initialization.

55. The base station of claim 45, wherein the WLAN protocol is a proprietary protocol.

56. The base station of claim 45, wherein said mobile phone is configured to communicate with another mobile phone using the WLAN protocol.

57. The base station of claim 45, wherein the base station includes transmit and receive circuitry.

58. The base station of claim 45, wherein the mobile phone standard is selected from a group consisting of asynchronous transfer mode (ATM), Ethernet, WLAN, 3GPP standards such as Universal Mobile Telecommunications System (UMTS) and Long Term Evolution (LTE).

59. The base station of claim 58, wherein the WLAN protocol is selected from a group consisting of radio link control (RLC), packet data convergence (PDC), broadcast/multicast control (BMC) and radio resource control (RRC).

60. The base station of claim 45, further comprising processors capable of accepting different mobile phone standards and wherein at least one of the processors is configured to provide an identifier signal identifying the at least one function of the mobile phone standard with the at least one function of the WLAN protocol.

61. The base station of claim 45, wherein the processor is configured to communicate in the WLAN protocol to one or more intermediary communication nodes.

62. The base station of claim 45, wherein the WLAN protocol is used by the base station to communicate to the mobile phone.

63. The base station of claim 45, wherein the processor is configured to provide an identifier signal identifying the at least one function of the mobile phone standard with the at least one function of the WLAN protocol responsive to a mobile phone acknowledging acceptance of the WLAN protocol.

* * * * *